Mar. 20, 1923.

G. L. BRIESE ET AL.
LOCK NUT.
FILED FEB. 6, 1922.

1,448,952.

INVENTORS.
GEORGE L. BRIESE.
EDWARD B. MARTIN.
BY THEIR ATTORNEY.
James F. Williamson Patented Mar. 20, 1923.

1,448,952

UNITED STATES PATENT OFFICE.

GEORGE L. BRIESE AND EDWARD B. MARTIN, OF MINNEAPOLIS, MINNESOTA.

LOCK NUT.

Application filed February 6, 1922. Serial No. 534,412.

*To all whom it may concern:*

Be it known that we, GEORGE L. BRIESE and EDWARD B. MARTIN, citizens of the United States, residing at Minneapolis, in the county of Hennepin and State of Minnesota, have invented certain new and useful Improvements in Lock Nuts; and we do hereby declare the following to be a full, clear, and exact description of the invention, such as will enable others skilled in the art to which it appertains to make and use the same.

This invention relates to a lock nut. It is well known that nuts applied to the ends of bolts will work loose under wear and vibration of the secured parts and will often become entirely disengaged from the bolts. Much damage has been done to machinery and other structures by the nuts thus becoming loosened and frequently becoming lost.

It is an object of this invention to provide a very simple and efficient means to securely lock the nut in its tightened position on the bolt, which means has provision for quickly removing the same in case it is desired to further adjust the nut.

It is most specifically an object of the invention to provide such a nut locking means comprising a transverse kerf formed in the nut adjacent the top of the same in which kerf an expanding member is adapted to be driven.

These and other objects and advantages of the invention will fully appear from the following description made in connection with the accompanying drawings in which like reference characters refer to the same parts throughout the different views and in which—

Figure 1:
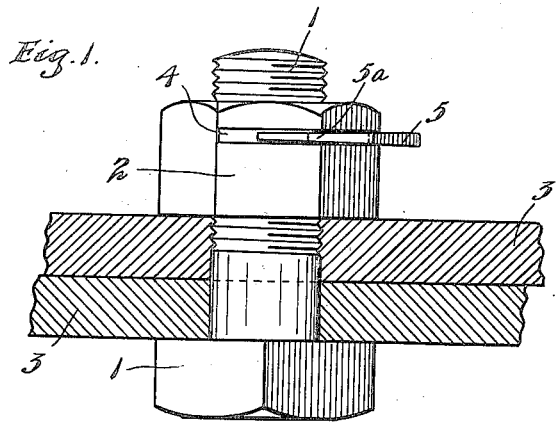
Fig. 1 is a view in side elevation of the device showing the bolt and the parts held together thereby.

Referring to the drawings, in Fig. 1 is shown a bolt 1 having the usual threaded end upon which is screwed a nut 2 of common form. The bolt 1 passes through the members 3 against which the nut 2 is tightened to hold said members in close position. The nut and locking means of the present invention are, of course, adapted to be used on any threaded bolt or screw wherever the same may be used.

In accordance with the present invention, a kerf or slot 4 is formed in the nut adjacent the top or outer end thereof, which slot has substantially parallel sides and extends in a plane substantially normal to the axis of the nut and bolt. The kerf extends through the nut to a line passing substantially tangential to the far side of the tapped hole therethrough, as shown in Figs. 1 and 2.

Figure 4:
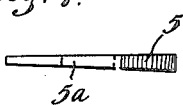
Fig. 4 is a view in side elevation thereof.

In order to hold the nut in its tightened position, a wedge member 5 is provided having a central slot or opening therein formed with a semi-circular end, which member is adapted to be driven into the slot 4. As shown in Figs. 1 and 4, this member 5 is of wedge shape and the greatest thickness thereof will be appreciably greater that the width of the slot 4. The wedge member will be driven into said slot 4 and the side of the opening therein will engage somewhat with the grooves in the threads on the bolt. The upper portion of the nut 4 above the kerf or slot will be pressed upwardly or outwardly so that the kerf and nut are thus expanded. A portion of the nut above the slot 4 will thus be moved into extremely tight binding engagement with the bolt so that it will be impossible for the nut to turn thereon. The member 5 is so shaped that when driven into place, the outer edges thereof will lie substantially flush with the sides of the nut. The member is further provided with a short extension 5ª which, when the wedge is driven into place, will project at one corner of the nut. If it should be desired to remove the member 5 to remove or adjust the nut, said member can be easily removed by simply driving it out of the nut by striking the projection 5ª with a suitable implement.

Figure 2:
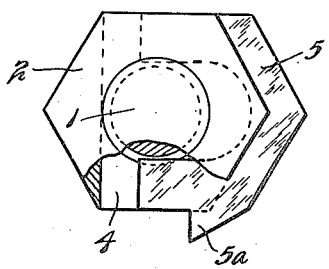
Fig. 2 is a top plan view of Fig. 1, a part thereof being shown in section.
Figure 5:
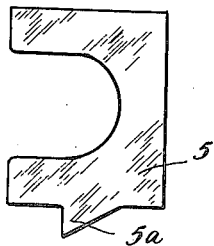
Figs. 5 and 6 are, respectively, a plan view and side view of a modified form of wedge.
Figure 3:
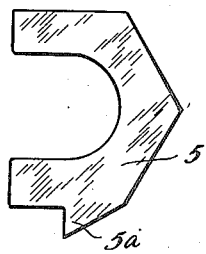
Fig. 3 is a plan view of the wedge used.
Figure 6:
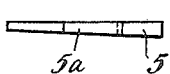

While the center of the member 5 in Figs. 2 and 3 has been shown as being at one of the points or sharp edges of the nut, it, of course, could be made so that the center of the wedge would extend along one of the flat sides. It will also be understood that the wedge can be made to fit nuts of various shapes. In Figs. 5 and 6, a wedge is shown designed to be used with a square nut and the wedge shown in said figures is otherwise shown in Figs. 2 and 3 and already described.

From the above description it is seen that applicant has provided a very simple and efficient form of lock nut. By the use of the device, the nut is firmly locked in position and the wedge 5 is so tightly held in the nut by frictionally engaging therewith that it cannot be jarred out or removed, except by a positive effort. The nut is not appreciably weakened and, if desired, may be made of a very slightly increased length so that no strength of structure is sacrificed. It will also be noted that the bolt is in no way affected or damaged by the use of the nut locking device. The structure is easily and inexpensively made and in actual practice has been found very efficient for the purpose intended.

It will, of course, be understood that various changes may be made in the form, details and arrangement of the parts without departing from the scope of applicant's invention, which, generally stated, consists in the matter shown and described and set forth in the appended claims.

What is claimed is:

1. A lock nut structure comprising, a nut having a kerf cut therein adjacent its top surface extending substantially normal to the axis of the nut, and a concave edged wedge member adapted to be placed in said kerf to expand the nut and partially surrounding the bolt causing the same to grip the bolt.

2. A lock nut structure comprising a nut having a slot with substantially parallel sides cut therein adjacent the top thereof and extending substantially normal to the axis of the nut, and a concave wedge member adapted to be driven into said slot to expand the same and partially surround the bolt causing the nut to firmly grip the bolt.

3. A lock nut structure comprising a nut having a slot cut therein adjacent its top surface extending substantially normal to the axis of the nut and to a line passing adjacent the remote side of the bolt opening, and a wedge member having a central opening therein adapted to be driven into said slot and straddle the bolt passing through the nut, said wedge member acting to expand the nut and cause the same to tightly bind on the bolt.

4. A lock nut structure comprising, a nut having a kerf cut therein, a wedge member adapted to be driven into said kerf to expand the nut and means on the side of said wedge member by which the same may be driven out of said kerf.

5. A lock nut structure comprising, a nut having a kerf cut therein adjacent its top surface extending substantially normal to the axes of the nut and a wedge member adapted to be driven into said kerf to expand the nut causing the same to grip the bolt and a projecting means on one side of said wedge member by which the same may be driven out of said kerf.

6. A lock nut structure comprising a nut having a slot cut therein adjacent its outer face and substantially parallel with the face of the nut, said slot extending substantially across the threaded opening in the nut, and a wedge member having a central semi-circular ended opening therein adapted to be driven into the slot and straddle the bolt with the sides of said opening therein engaging in the threads of the bolt on which the nut is disposed, said wedge member acting to expand the nut to cause the same to tightly bind on the bolt.

7. A lock nut structure comprising a nut having a slot cut therein substantially parallel to its faces and adjacent the top portion thereof, and a wedge member adapted to be driven into said slot when the nut is applied to a bolt to expand the nut and cause the same to bind on the bolt, said wedge member having edges adapted to lie flush with the sides of the nut when it is placed in position and also having a projection extending beyond the sides of the nut whereby the same can be driven out of the nut.

8. A lock nut structure comprising, a nut having a kerf cut therein adjacent its top surface extending substantially normal to the axes of the nut and a wedge member adapted to be driven in said kerf to expand the nut causing the same to grip the bolt, said wedge member having edges formed to lie substantially flush with the sides of the nut when placed in position therein and one edge extended to form a projecting means by which the said wedge member may be driven out of said kerf.

9. A lock nut structure comprising, a nut having a kerf cut therein adjacent its top surface extending substantially normal to the axes of the nut and a wedge member adapted to be driven into said kerf and engage and partially embrace the threads of said bolt.

In testimony whereof we affix our signatures.

GEORGE L. BRIESE.
EDWARD B. MARTIN.